(12) United States Patent  (10) Patent No.: US 8,552,713 B2
Marto et al.                  (45) Date of Patent: Oct. 8, 2013

(54) LINEAR SENSOR

(75) Inventors: Arno Marto, Weil der Stadt (DE); Stefan Leopold, Kirchheim (DE); Klaus-Juergen Wagner, Grossbottwar (DE); Heiko Schrader, Kleinbottwar (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 443 days.

(21) Appl. No.: 12/866,887

(22) PCT Filed: Feb. 23, 2009

(86) PCT No.: PCT/DE2009/000238
§ 371 (c)(1),
(2), (4) Date: Aug. 9, 2010

(87) PCT Pub. No.: WO2009/106048
PCT Pub. Date: Sep. 3, 2009

(65) Prior Publication Data
US 2010/0315072 A1    Dec. 16, 2010

(30) Foreign Application Priority Data
Feb. 28, 2008   (DE) .................. 10 2008 011 615

(51) Int. Cl.
*G01B 7/14*   (2006.01)
(52) U.S. Cl.
USPC ............... 324/207.24; 324/207.2; 702/158
(58) Field of Classification Search
USPC .................................. 324/207.24
See application file for complete search history.

(56) References Cited

U.S. PATENT DOCUMENTS

| 3,604,115 | A | * | 9/1971 | McDonald | 30/348 |
| 3,626,919 | A | * | 12/1971 | MacMillan | 123/198 DB |
| 4,566,555 | A | * | 1/1986 | Schlanger | 180/274 |
| 5,348,425 | A | * | 9/1994 | Heiliger | 405/297 |
| 5,789,920 | A | | 8/1998 | Gass | |
| 5,890,705 | A | * | 4/1999 | Lee | 267/150 |
| 6,611,418 | B2 | * | 8/2003 | Mazlout et al. | 361/234 |
| 6,670,805 | B1 | * | 12/2003 | Bahr et al. | 324/207.2 |
| 6,823,725 | B2 | * | 11/2004 | Lohberg | 73/114.01 |
| 2004/0129095 | A1 | * | 7/2004 | Churchill et al. | 73/866.5 |
| 2006/0022667 | A1 | * | 2/2006 | Nyce | 324/207.24 |

FOREIGN PATENT DOCUMENTS

| DE | 196 24 233 C1 | 10/1997 |
| DE | 197 51 519 A1 | 5/1999 |
| DE | 10 2006 030 999 A1 | 1/2008 |
| GB | 349213 A | 5/1931 |
| WO | WO 01/01066 A1 | 1/2001 |

* cited by examiner

*Primary Examiner* — Melissa Koval
*Assistant Examiner* — Stephen G Armstrong
(74) *Attorney, Agent, or Firm* — Hackler Daghighian & Martino

(57) ABSTRACT

The invention relates to a linear sensor, comprising a sleeve, a pin which comprises a permanent magnet and is linearly displaceably supported in the sleeve, and a magnetic field sensor which is fastened to the sleeve and used to detect a displacement of the permanent magnet, characterized in that the pin is guided by way of a substantially cylindrical guide and has a magnet or pin holder.

20 Claims, 1 Drawing Sheet

LINEAR SENSOR

FIELD OF THE INVENTION

The invention relates to a linear sensor, comprising a sleeve, a pin which contains a permanent magnet and is supported in the sleeve so it can be linearly displaced, and a magnetic field sensor that is attached to the sleeve for detecting a displacement of the permanent magnet.

BACKGROUND OF THE INVENTION

Such linear sensors are used in motor vehicle technology, for example, for controlling brake boosters, the activation of which is carried out as a function of the travel of a brake pedal. As the pedal travel increases, the brake pressure acting on a control member is increased, the travel of which can be determined by way of a linear sensor. Another example is boost-pressure controllers for exhaust gas turbochargers. In such applications, in general the pin of the linear sensor is pressed against a movable measurement object, such as a control member, by a spring force, so that the pin always rests against the measurement object and follows the movement thereof.

A linear sensor is known from DE 196 24 233 C1, wherein a cuboid permanent magnet is displaced relative to a magnetic field sensor disposed in a stationary manner on a housing. The known linear sensor, however, is less suited for applications in motor vehicle technology, because it responds sensitively to vibrations which may develop due to engine operation, is prone to wear, and requires high manufacturing costs and frequent adjustments.

DE 197 51 519 C2 describes a linear sensor, for example for controlling a brake booster for generating an electric control signal as a function of the relative position of two parts displaceable relative to each other, wherein the linear sensor has a magnet, with which at least one Hall sensor is associated, wherein the magnet and the Hall sensor are held such that they can be displaced relative to each other and the Hall sensor supplies an electric voltage signal that is dependent on the position of the sensor relative to the magnet, wherein the magnet is fixed non-displaceably in a housing of the linear sensor and the Hall sensor can be displaced relative to the magnet in the housing.

SUMMARY OF THE INVENTION

It is therefore an object of the invention to provide a way for creating a linear sensor which is suited for motor vehicle technology, is cost-effective to produce, and enables precise measurements, even if vibrations occur during driving operation.

This object is achieved by a linear sensor having the characteristics of claim 1. Advantageous embodiments of the invention are the subject-matter of the dependent claims.

In a linear sensor according to the invention, highly precise guidance of the pin is achieved using very simple means, preferably in that a constriction of the sleeve forms a guide.

Transverse movements of the pin resulting in measurement errors can be largely excluded with a linear sensor according to the invention. The position of a measurement object can therefore be precisely determined even if vibrations occur, such as those caused by the operation of the engine, when using a linear sensor according to the invention.

Because the pin and the sleeve only come in contact with each other at the guide, advantageously a small friction surface is created. Small friction surfaces produce low friction forces, thereby enabling a low-wear operation and high long-term stability.

The magnetic field sensor is preferably attached to a section of the sleeve forming the constriction. This measure has the advantage that the distance between the magnetic sensor and the pin, measured perpendicular to the direction of movement of the pin, remains constant, even with engine-related vibrations, and can therefore always be measured with high accuracy.

The pin preferably has a circular cross-section, which simplifies production and is favorable for lower friction. It is particularly preferred if the pin can be rotated about the longitudinal axis thereof in the sleeve. During the operation of a vehicle, vibrations or movements of the measurement object may cause a torque to be applied on the pin. Because the pin can be rotated, such torques can relax without applying stress on the guidance of the pin.

According to an advantageous refinement of the invention, the pin and/or the sleeve are made of a graphite particle-containing plastic. In this way, abrasion, which is inevitable during operation, ensures a continuous supply of lubricants due to the release of graphite particles. Even after long operation, in this way low friction forces are always ensured, so that an accordingly designed linear sensor can be operated stably over very long periods. It is particularly preferred that the pin is made of a graphite particle-containing plastic, in particular that the sleeve is made of a graphite particle-free plastic.

According to another advantageous refinement of the invention, the sleeve and the pin are made of the same plastic, apart from an optionally present addition of graphite particles. In this way, the thermal coefficient of expansions between the sleeve and pin agree, resulting in consistently precise guidance over a very wide temperature range. Thermoset materials are the preferred materials for the sleeve and the pin.

According to a further advantageous refinement of the invention, the pin is rounded off at the end thereof protruding from the sleeve. This measure has the advantage that the risk of tilting the measurement object, which could impair the measuring accuracy, is reduced when pressing the pin against a measurement object.

According to another advantageous further development of the invention, the magnet holder is dome-shaped. It is advantageous that the magnet holder allows radial movements to a defined extent if vibrations occur, thereby preventing the system from breaking.

According to another advantageous further development of the invention, the magnet holder comprises at least three spring elements. By accordingly designing the spring rate of the particular spring, the tolerance in particular of the radial mobility of the magnet housing or of the pin can be precisely defined in the motor vehicle which is subject to natural vibrations.

According to an advantageous further development of the invention, the magnet or pin holder is made of plastic and/or metal. Advantageously, in this way, for example, the annular element integrated in the magnet holder can be made of plastic. The dome-shaped part or the spring elements of the magnet holder are made of metal, so that a damped spring mass system is obtained, which when suitably designed minimizes the influence of resonances on the measurement result, while achieving high operational reliability at the same time. System failure is prevented due to the, in particular radial, inclination serving compensating purposes. Furthermore, the rigid connection between the measurement object and magnet holder as well as the quasi rigid connection between the magnet holder and magnet housing ensure that the measured path in fact corresponds to the actual path of the measurement object.

At the end protruding from the sleeve, the pin preferably has a face, the diameter of which is 20% to 60% of the inside diameter of the sleeve at the constriction. A face that is reduced with respect to the pin diameter causes the transmission of transverse forces to be reduced in the event that the measurement object is tilted. As a result, the guidance of the pin in the sleeve is subjected to lower stress, and transverse movements impairing the measuring accuracy can be prevented more easily. A face having a diameter that is 20% to 60% the diameter of a cylindrical pin section supported in the sleeve is also large enough to limit the surface load of the contact surface resting against the measurement object to a degree that is suitable for low-wear operation.

Further details and advantages of the invention will be explained based on an exemplary embodiment with reference to the attached figures. The characteristics described can become subject matters of claims either individually or in combination with each other.

DETAILED DESCRIPTION OF THE DRAWINGS

Figure 1:
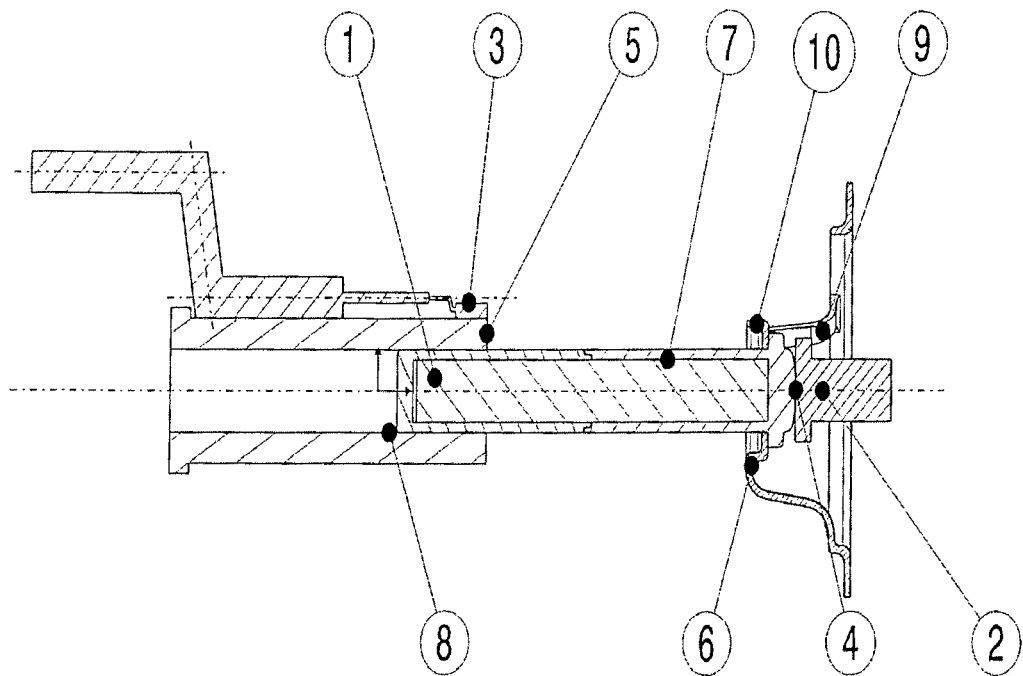
FIG. 1: An exemplary embodiment of a linear sensor in a longitudinal section.

FIG. 1 shows a linear sensor comprising a sleeve 5, in which a cylindrical pin 7 is disposed so it can be linearly displaced. The pin 7 comprises a permanent magnet 1, which preferably is a bar magnet, and rests against a measurement object 2 with the end 4 thereof protruding from the sleeve 5.

A magnetic field sensor 3, preferably a Hall sensor, is attached to the sleeve 5. A displacement of the pin 7 comprising the permanent magnet 1 disposed therein brings about a change in the magnetic field at the site of the magnetic field sensor 3. By evaluating this change, the position of the permanent magnet 1 and hence that of the measurement object 2 can be determined.

The pin 7 and the sleeve 5 come in contact with each other in a planar manner in the region of the guiding surface, which further increases the precision of the axial and radial guidance. It is advantageous to attach the magnetic field sensor 3 to the section of the sleeve 5 forming the constriction, because there the distance of the pin 7 from the magnetic field sensor 3 perpendicular to the direction of movement of the pin 7 remains constant, even if vibrations occur.

At the end 4 protruding from the sleeve 5, the pin 7 is rounded off and has a flat face, the diameter of which is 50% of the inside diameter of the sleeve 5 at the constriction thereof in the illustrated embodiment. Due to this geometric design, not only a sufficiently large contact surface for a low surface load is achieved, but also a low-wear operation. In addition, a reduced support surface minimizes friction, and the transmission of transverse forces during potential tilting of the measurement object 2 is prevented. In general, it is advantageous if the face has a diameter of approximately 20% to 60% of the inside diameter of the sleeve 5 at the constriction.

The pin 7 is produced by insert molding the permanent magnet 1 using a thermoset material. The sleeve 5 is also made of a thermoset material, preferably the same thermoset material. In this way, the pin 7 and the sleeve 5 have similar thermal expansion coefficients, whereby jamming and clearance are prevented in the region of the guiding surface 8 within a wide temperature range. The illustrated linear sensor can thus be installed in particular in the engine compartment of a motor vehicle and heat up to 170° C. during operation without impairment.

In order improve the sliding properties, it is preferable to use a thermoset material having added graphite particles for the pin 7. The added graphite particles reduce the hardness of the thermoset material. In this way, inevitable abrasion during operation will occur practically exclusively at the pin 7, but not at the sleeve 5. Because the abrasion comprises a graphite filler, the abrasive dust acts as a lubricant in the guiding surfaces 8. This advantage can also be used in that the sleeve 5, instead of the pin 7 or in addition to the pin 7, is produced from graphite particle-containing plastic.

However, it is particularly advantageous if the thermoset material of the pin 7 comprises graphite particles. Abrasion occurring at the face 4 then reduces friction and therefore lowers the transversal forces, which can develop during tilting of the measurement object 2. In principle, it is also possible to use graphite particle-containing plastic for both the sleeve 5 and the pin 7. Due to the increased abrasion, however, this is not preferred.

Figure 2:
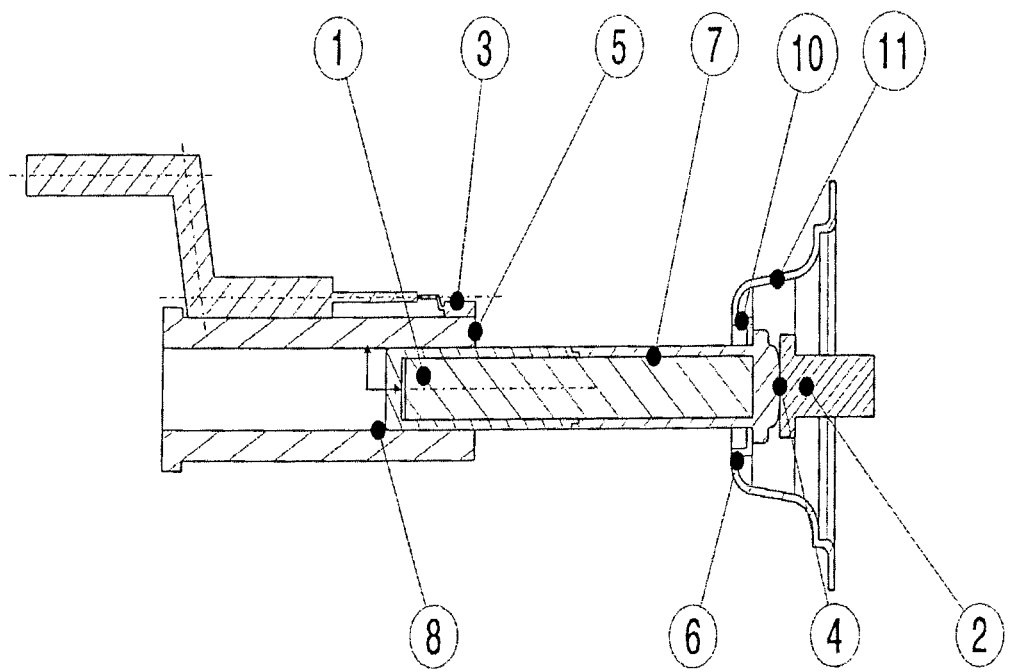
FIG. 2: A linear sensor comprising a dome-shaped magnet holder.

FIG. 2 shows a linear sensor comprising a sleeve 5, in which a cylindrical pin 7 is disposed so it can be linearly displaced. The pin 7 comprises a permanent magnet 1 and rests against a measurement object with the end 4 thereof protruding from the sleeve 5. A Hall sensor 3 is fastened to the sleeve 5. A displacement of the pin 7 brings about a change in the magnetic field in the region of the sensor 3.

By evaluating this change, the position of the magnet 1 and hence that of the measurement object 2 can be determined. Contrary to the exemplary embodiment of FIG. 1, the magnet holder 6 has a dome-shaped region 11 in the exemplary embodiment of FIG. 2.

LIST OF REFERENCE NUMERALS

1. Magnet
2. Measurement object
3. Magnetic field or Hall sensor
4. Contact surface between the sensor and the measurement object/end
5. Guide or sleeve
6. Magnet holder
7. Magnet housing/pin
8. Guiding surface
9. Spring element
10. Annular element
11. Dome-shaped region of the magnet holder

What is claimed is:
1. A linear sensor comprising:
a sleeve;
a pin comprising a permanent magnet where the pin is linearly displaceably supported in the sleeve and guided by way of a substantially cylindrical guide, the pin including a contact surface abuttable against a measurement object;
a magnetic field sensor fastened on the sleeve and configured to detect a displacement of the permanent magnet; and
a pin holder rigidly connectable at a distal end to the measurement object and at a proximal end resiliently biased against the pin configured to resiliently bias the contact surface against the measurement object.

2. The linear sensor according to claim 1, wherein the guide of the pin is formed by a constriction of the sleeve on which the pin comes in contact with the sleeve.

3. The linear sensor according to claim 1, the pin holder comprising at least three spring elements disposed substantially equally radially apart on a substantially inner annular element at the proximal end, where the pin extends through the inner annular element and where the inner annular element is biased against the pin.

4. The linear sensor according to claim 1, wherein the pin holder is dome-shaped.

5. The linear sensor according to claim 2, wherein the pin holder comprises at least three spring elements.

6. The linear sensor according to claim 5, wherein the at least three spring elements are disposed on a substantially annular element at the proximal end.

7. The linear sensor according to claim 6, wherein the pin comprises a thickening between the annular element and the measurement object.

8. The linear sensor according to claim 7, wherein the thickening of the pin abuts the annular element.

9. The linear sensor according to claim 1, wherein the pin and/or the sleeve are made of a graphite particle-containing plastic.

10. The linear sensor according to claim 1, wherein the pin is made of a graphite particle-containing plastic.

11. The linear sensor according to claim 1, wherein the sleeve is made of a thermoset material.

12. The linear sensor according to claim 1, wherein the pin is made of a thermoset material.

13. The linear sensor according to claim 1, wherein the sleeve and the pin are made of the same thermoset material.

14. The linear sensor according to claim 1, wherein the pin is produced by insert molding the permanent magnet.

15. The linear sensor according to claim 1, wherein the pin has a circular cross-section.

16. The linear sensor according to claim 1, wherein the pin is rounded off at the contact surface.

17. The linear sensor according to claim 1, wherein at the contact surface comprises a diameter of which is 20% to 60% of an inside diameter of the sleeve.

18. The linear sensor according to claim 2, wherein the magnetic field sensor is attached to a section of the sleeve forming the constriction.

19. The linear sensor according to claim 1, wherein the pin can be rotated in the sleeve.

20. The linear sensor according to claim 1, wherein the pin holder is made of plastic and/or metal.

* * * * *